(No Model.) 2 Sheets—Sheet 1.
G. G. GILBERTSON.
PULVERIZING ATTACHMENT FOR CULTIVATORS.
No. 604,313. Patented May 17, 1898.
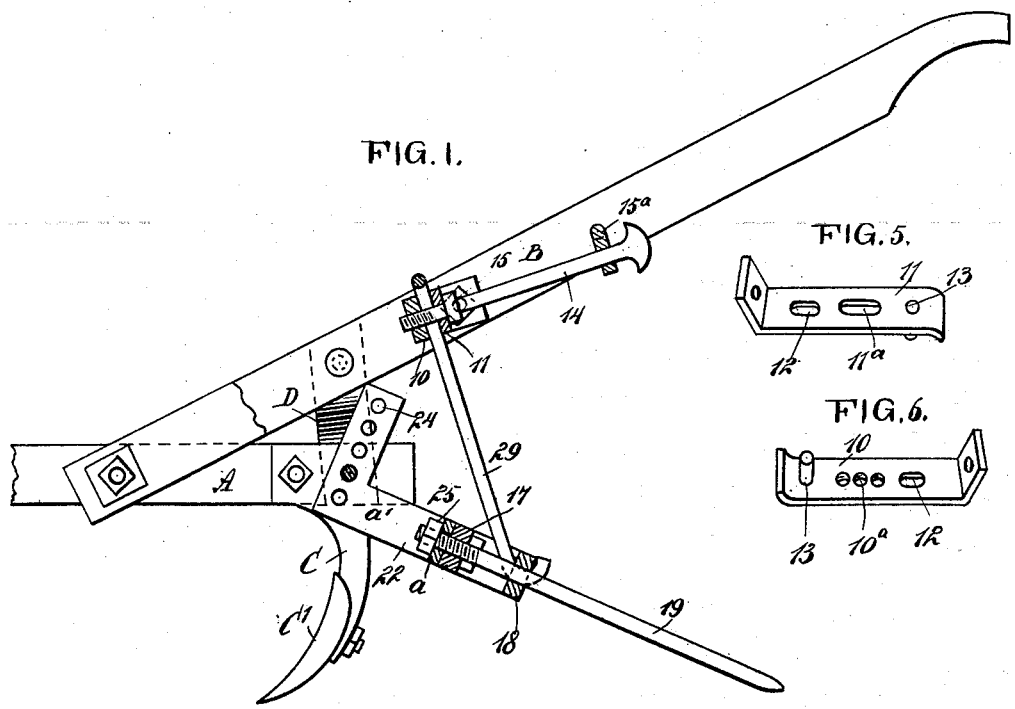
WITNESSES
Donn Twitchell
INVENTOR
G. G. Gilbertson
BY
ATTORNEYS (No Model.)  2 Sheets—Sheet 2.
G. G. GILBERTSON.
PULVERIZING ATTACHMENT FOR CULTIVATORS.
No. 604,313. Patented May 17, 1898.
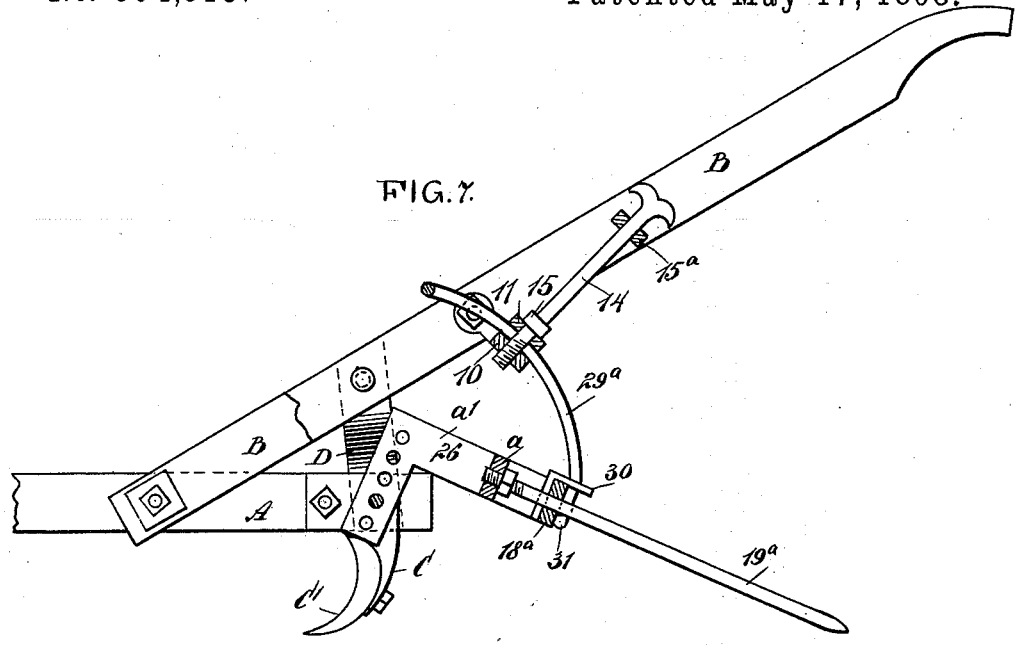
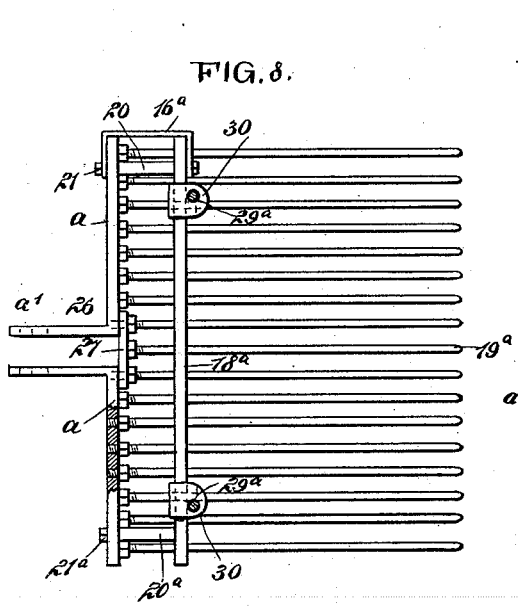
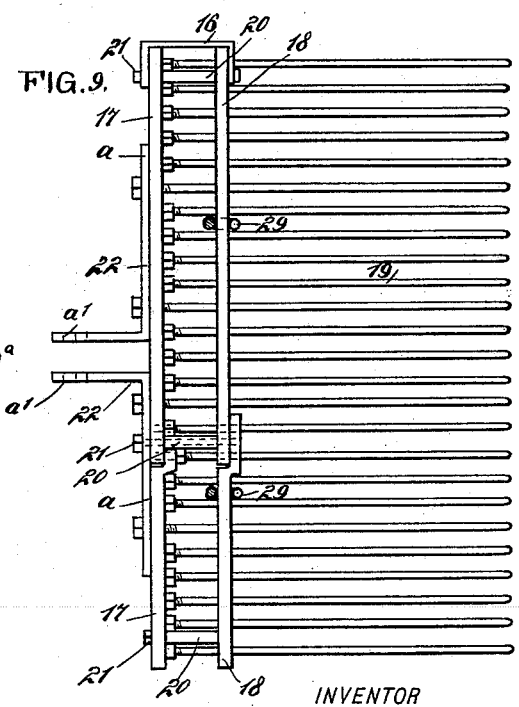
WITNESSES:
Donn Turtchell
J. Fred. Acker
INVENTOR
G. G. Gilbertson
BY
[signature]
ATTORNEYS.

UNITED STATES PATENT OFFICE.

GILBERT G. GILBERTSON, OF WEST MITCHELL, IOWA.

PULVERIZING ATTACHMENT FOR CULTIVATORS.

SPECIFICATION forming part of Letters Patent No. 604,313, dated May 17, 1898.

Application filed May 24, 1897. Serial No. 637,878. (No model.)

*To all whom it may concern:*

Be it known that I, GILBERT G. GILBERTSON, of West Mitchell, in the county of Mitchell and State of Iowa, have invented a new and Improved Pulverizing Attachment for Cultivators, of which the following is a full, clear, and exact description.

The object of the invention is to provide a pulverizing attachment for cultivators which may be readily attached to the rear of a one-horse cultivator, horse-hoe, or implement of like type, the attachment being exceedingly simple, durable, and economical and capable of being adjusted through the medium of the handles of the implement, which will act in the capacity of levers.

Another object of the invention is to construct the pulverizing attachment in such manner that it will level the ridges left by the cultivator teeth or blades and whereby the implement will not clog, but will gather rubbish and weeds and leave them exposed at the top of the ground.

Another object of the invention is to provide a pulverizing and harrowing attachment for cultivators and the like which will cause the cultivator to run more steadily and truly than ordinarily and which may be used to regulate the depth at which the cultivator-teeth shall enter the ground.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1 is a side elevation of the rear portion of a one-horse cultivator, one of the handles being broken away, and a vertical section through the pulverizing attachment and the devices by means of which it is adjusted from the handle. Fig. 2 is a rear elevation of the cultivator and the attachment applied. Fig. 3 is a horizontal section through a portion of the head of the pulverizing attachment. Fig. 4 is a detail view of one of the attaching-plates used in connection with the device as shown in Fig. 1, whereby the pulverizer is connected with the beam of the cultivator. Figs. 5 and 6 are detail perspective views of the plates connected with the handles of the cultivator, through which the adjusting device for the attachment is passed. Fig. 7 is a view similar to Fig. 1, illustrating, however, the attachment in reversed position, whereby it may be connected with a low-beam cultivator, accomplishing the same results as when attached to a high-beam cultivator, as illustrated in Fig. 1. Fig. 8 is a plan view, partly in section, of the attachment in its simplest form, adapted to be secured to a certain style of cultivator; and Fig. 9 is a plan view of the attachment, parts being in section, in which view the frame carrying the tines is shown as in sections, enabling the attachment to be varied in width according to the character of the machine to which it is to be applied.

A represents the beam of the cultivator; B, the handles; C, the stock; C', the cultivator-blade, attached to the stock, and D braces which connect with the handles and with the beam.

Between the handles two plates 10 and 11 are transversely placed, the plate 10 being secured at one end to one of the handles and the plate 11 at its opposite end to the other handle. These two plates are usually made of a spring material, and one lies in front of the other, the free end of one plate engaging with the opposite plate near its attached end, and for this purpose the free ends of the plates are more or less curved. Each plate is provided near its attached end with a slot 12 and near its free end with a pin 13, the pin of one plate being arranged to enter the slot 12 of the opposing plate. A clamping-screw 14 is loosely passed through a slot 11$^a$ in the rear plate 11, as shown in Fig. 2, a collar 15 being secured to the clamping-screw at the rear of its threaded portion and adapted to bear against the said plate 11. A link 15$^a$ serves to support the rear end of the clamping-screw, which is within convenient reach of the attendant grasping the handles. The forward or threaded end of the screw 14 is adapted to enter any one of a group of tapped openings 10$^a$ in the plate 10 near its center. By turning the clamping-screw in one direction the clamping-plates 10 and 11 may be spread apart, and by turning the screw in the opposite direction the collar 15 will be brought in engagement with the rear plate and the two plates will be drawn together. The group of tapped openings is provided in order that the attachment may be leveled if not hung straight, since by placing the adjusting-screw in an end opening 10ª the attachment may be dropped upon one side and raised upon the other.

The pulverizing attachment under the form of construction shown in Figs. 1, 2, 3, and 4 consists of a head comprising parallel bars 17 and 18, connected at one end by a bracket 16, and tines 19, which pass through said bars 17 and 18. The tines 19 are preferably made diamond-shaped at their free or rear ends; but they may be otherwise formed at such point, and each tine is loosely passed through the rear bar 18 of the head, and most of them are screwed into the forward bar 17 of the head, being provided each with a nut bearing against the rear face of said bar, the nuts serving to prevent displacement of the tines. The bars 17 and 18 are spaced apart by sleeves 20, placed between them near their ends, and bolts 21, which pass through both head-bars and through the sleeves, as shown particularly in Fig. 3.

Two attaching-plates 22 are adjustably secured to the forward face of the forward head-bar 17 of the attachment. Each attaching-plate consists of a horizontal member $a$, having slots 23 therein, and an angular member $a'$, as is best shown in Figs. 1, 2, and 4. The slotted members $a$ of the attaching-plates engage with the head-bar 17 and are secured thereto by certain of the tines 19, being made sufficiently long to extend through the slots 23 at their forward ends, as illustrated in Figs. 1 and 3. One portion of the angular member $a'$ of each attaching-plate is carried rearward from the end in the same plane therewith, the other portion extending upward, and in this upwardly-extending portion of each attaching-plate apertures 24 are produced. A hanger 29 in the shape of a bail is provided for the head portion of the attachment. The upper portion of the hanger is contracted, and the members at the lower portion of the hanger are spread apart and are pivotally connected with the rear bar 18 of the said head. The attaching-plates are made adjustable on the head of the pulverizer in order that the attachment may be applied to beams of different thicknesses. Such attachment is made as follows: The braces D of the cultivator are disconnected from the beam, and the upwardly-extending members of the attaching-plates 23 are introduced between said braces and the sides of the beam. The bolt which is employed for securing the braces to the beam is then passed through the braces and through one of the apertures 24 in the attaching-plates. The forward portion of the attachment may be raised or lowered by passing this bolt through an upper or a lower aperture 24. The contracted end of the hanger or bail 29 is passed up through the two clamping-plates 10 and 11, and the clamping-screw is passed through the bail. When it is desired to raise the attachment, it is simply necessary to loosen the clamping-screw and bear down upon the handles until the tines shall have been given the proper inclination, whereupon the clamping-screw is again tightened. When the attachment is to be lowered, the adjusting-screw is loosened. The foot of the operator is placed upon the tines and the handles lifted up, after which the clamping-screw is again set. The use of the attachment will prevent the ground from washing in heavy rains by reason of the leveling of the cultivator-furrows.

When the pulverizing attachment is to be made for one style of cultivator, the exact thickness of its beam being known, the bar 17 of the head shown is omitted, and the head is constructed as shown in Fig. 8. Under this latter construction the members $a$ of the attaching-plates designated as 26 and corresponding to the plates 22, heretofore described, are of sufficient length to receive all the tines $19^a$, which tines are passed loosely through a rear bar $18^a$ and are screwed into the aforesaid members $a$ of the attaching devices. Those of the tines that would naturally come opposite the space between the members $a'$ of the attaching devices are screwed into a cross-bar 27, spanning said space. At one end of the head the attaching device at said end is connected with the cross-bar $18^a$ by a bracket $16^a$.

In Fig. 7 I have illustrated the application of the attachment to a low-beam cultivator. In making such attachment the position of the attaching-bars is just the reverse of the position shown in Figs. 1 and 2, and the bail 29 (shown in Figs. 1 and 2) is substituted by a bail $29^a$, which is curved in such manner as to present a concaved surface to the front; but the same style of fastening devices are employed for the bail as have been heretofore described. The lower ends of the members of the bail $29^a$, however, are preferably passed through fastening-plates 30, secured to the rear bar $18^a$, and the lower extremities of the members of such bail are provided with eyes 31, which receive the nearest tine $19^a$.

In Fig. 9 I have illustrated a construction which differs only from the construction shown in Figs. 1 and 2 in that the attachment is made in two sections—that is to say, each head-bar 17 and 18 is in two sections, connected by the tines passing between them and separated by the sleeves and nuts 20 and 21, heretofore alluded to. When the attachment is made in sections, it may be reduced or increased in width, according to the character of the cultivator to which the attachment is to be applied.

Having thus described my invention, I claim as new and desire to secure by Letters Patent—

1. In a pulverizing attachment for cultivators and like implements, the combination with a head, tines carried thereby, and means for adjustably connecting the head with the beam of the implement of a clamp comprising cross-bars connected at one end to the cultivator-handles, a hanger connected to the tine portion of the attachment and entering said portion, and a clamping-screw passing through the bars of the clamp and securing the hanger, substantially as described.

2. A combination with the beam and the handles of a cultivator or like implement, of a pulverizing attachment consisting of tines, a support for the tines which support is pivotally connected with the beam, cross-bars connecting the handles, a clamping device laterally adjustable on said cross-bars and a hanger connected with the tine portion of the device and secured by said clamp, whereby the head may be adjusted in position, substantially as described.

3. A pulverizing attachment for cultivators, comprising a head formed as a bar extending across the same and having thereon a series of rearwardly-extending rake-like tines, a bar attached to the head and to the cultivator-frame forwardly, two bars extended between the cultivator-handles and each having one end bent to one side and secured to the handle and the other end having a slight side bend toward the other bar and also having a slot in one end of the central straight body, and a pin in the other end, said pins being adapted to enter the slot in the opposite bars, one of said bars having a longitudinally-extending central slot and the other a series of threaded holes opposite said slot, a bolt passing through the central slot and threaded into one of the central holes, and a stay formed as a rod bent upon itself, with the ends hooked and engaging the rake-head and near the central bend parallel and embracing the bolt between the two cross-bars, substantially as described.

4. The combination, with the beam and handles of a cultivator or like implement, a clamp secured to the handles, and an adjusting-screw for said clamp, of a pulverizing attachment consisting of a head, tines carried by the head, adjusting-plates adjustably connected with said head and pivotally and adjustably connected with said beam, and a hanger pivotally connected with the head and received by said clamp.

GILBERT G. GILBERTSON.

Witnesses:
R. C. LUBIENS,
C. A. JEGBUN.